United States Patent [19]

MacMillan

[11] Patent Number: 5,062,731
[45] Date of Patent: Nov. 5, 1991

[54] LOCKABLE/UNLOCKABLE PIVOTED CONNECTION APPARATUS

[76] Inventor: Donald M. MacMillan, 26607 30A Ave., Aldergrove, B.C., Canada, V0X 1A0

[21] Appl. No.: 476,741
[22] Filed: Feb. 8, 1990
[51] Int. Cl.$^5$ ............................................. F16C 11/10
[52] U.S. Cl. .......................................... 403/96; 403/97
[58] Field of Search ........................ 403/96, 95, 97, 93, 403/92

[56] References Cited

U.S. PATENT DOCUMENTS

| | | | |
|---|---|---|---|
| 2,932,537 | 4/1960 | Wolfe | 403/96 X |
| 3,232,136 | 2/1966 | Bahmuller | 403/93 X |
| 4,230,414 | 10/1980 | Cheshire | 403/95 |
| 4,614,452 | 9/1986 | Wang | 403/97 X |
| 4,747,569 | 5/1988 | Hoshino | 403/97 X |
| 4,815,740 | 3/1989 | Williams | 403/97 X |

*Primary Examiner*—Peter M. Cuomo
*Attorney, Agent, or Firm*—Robert W. Jenny

[57] ABSTRACT

The apparatus is for selectively preventing the motion of one part relative to another part to which it is pivotally connected. There is a plate with a planform of a segment of a circle attached to one part, the plate being perpendicular to the axis of the pivoted connection and the center of the segment coincident with the center of the pivot. A clamping apparatus is mounted on the other part and comprises a backstop on one side of the plate and a pointed part positioned on the other side of the plate opposite from the backstop and mounted on a mechanism by which a point of the pointed part can be pressed against the plate, in turn pressing the plate against the backstop to lock the connection. The working surface of the backstop is a set screw adjustable in the stop to adjust the clearance between the stop and the point of the pointed part. The pointed part has a plurality of points and can be attached to its supporting mechanism with any one of the plurality of points in position to engage the plate.

1 Claim, 1 Drawing Sheet

LOCKABLE/UNLOCKABLE PIVOTED CONNECTION APPARATUS

BACKGROUND OF THE INVENTION

1. Field

This invention is in the field of apparatus which provides a pivoted connection between two apparatuses as well as providing means to lock the pivotal connection; i.e. prevent relative motion between the connected apparatuses. More specifically, it is in the field of such apparatus used to connect a handle to an implement such as a broom or trowel. Still more specifically it is in the field of apparatus for connecting a handle to a flat finishing box, the apparatus used to fill and smooth over the joints between plasterboard panels used in drywall construction.

2. Prior Art

The closest prior art is that commonly used in commercially available flat finishing apparatus in which the connection between the handle and the flat finishing box comprises a bracket attached to the handle pivotally connected to a bracket attached to the box. The bracket on the box further comprises a segment of a circular plate with its center at the axis of the pivotal connection and oriented perpendicularly to that axis. The bracket on the handle further comprises a clamp which, when actuated, clamps the rim of the segment plate, thus preventing relative motion between the two brackets. The prior art clamp apparatus clamps the segment rim between a back stop and a point on a screw which is adjustable to minimize the locking/unlocking motion required in the clamp apparatus. In use the point of the screw flattens out, reducing its effectiveness and making it difficult or impossible to remove the screw for repair or replacement.

The objectives of the subject invention are to provide locking apparatus which is less prone to wearing out and reduces the need for part replacement and which is easier to repair or replace.

SUMMARY OF THE INVENTION

The subject apparatus is similar to the conventional apparatus in that it comprises a segment plate clampable between a back stop and a pointed part. However, the pointed part is a polyhedron in plan view, preferably an equilateral triangle and is mounted in the clamping apparatus so that one of its three apexes is pointed directly into the segment plate. There is line contact between the point and the plate, rather than the point contact of a screw, and this reduces the tendency of the point to flatten out. Further, the pointed apparatus is mounted such that any of its three apexes can be directed toward the plate so that when one point wears down another can be used without replacing the part and such that there is no difficulty in loosening or removing the part to adjust it or replace it when all three points become worn. The adjustment needed to keep clamp motion at a minimum is provided by a set screw installed in the back stop, adjustable to hold the segment plate as close to the point of the pointed apparatus as function allows.

The invention is described in more detail below with references to the attached drawings.

DETAILED DESCRIPTION OF THE INVENTION

Figure 1:
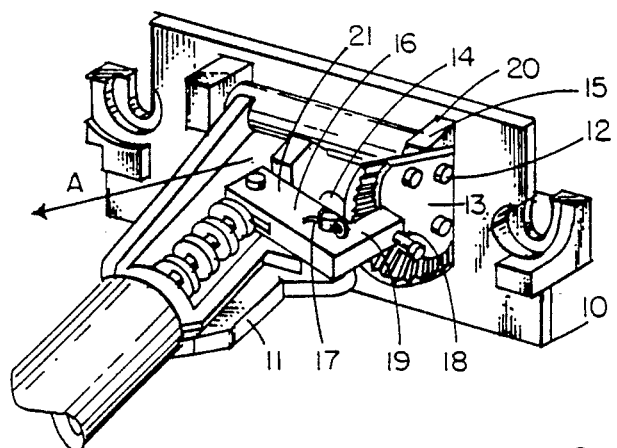
FIG. 1 illustrates a prior art lockable/unlockable pivoted connection between the brackets.

Referring to FIG. 1, a prior art lockable/unlockable pivoted connection between two brackets, bracket 10 is pivoted to bracket 11 by pin 12 with endplay in the connection allowing bracket 10 to move along the pin relative to bracket 11. Segment plate 13 is attached to bracket 10 and the center of the plate is at pin 12. Backstop 14 is part of bracket 10 and is in close proximity to side 15 of the plate.

The clamping mechanism is attached to bracket 11 and comprises bellcrank 16 pivoted to bracket 11 at pivot 17. Screw 18 in arm 19 of the bellcrank is oriented so that its non-head end contacts rim 10 of the plate when arm 21 of the bellcrank is operated in the direction indicated by arrow A. The screw is adjusted to minimize the amount of motion of arm 21 needed to cause the point of the screw to contact the plate, move it against the backstop and then clamp it to lock the pivoted joint.

Figure 2:
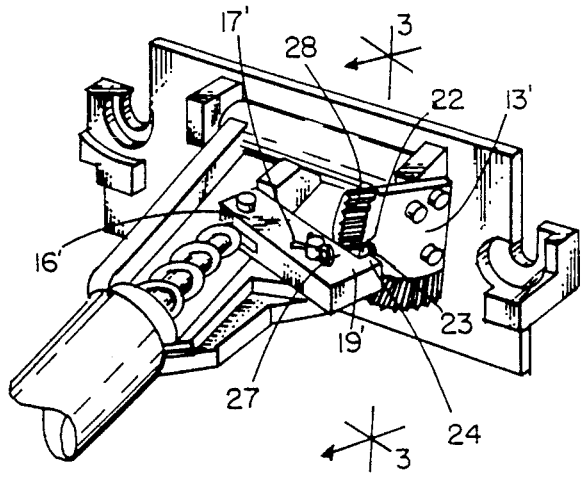
FIG. 2 illustrates the subject lockable/unlockable pivoted connection between two brackets.
Figure 3:
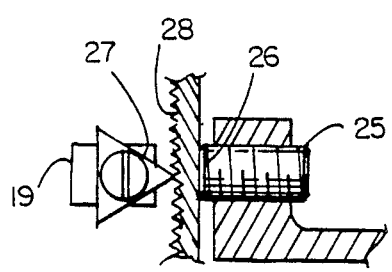
FIG. 3 illustrates an adjustment detail of the subject apparatus, being a schematic section taken at 3—3 in FIG. 2.

FIG. 2 illustrates a similar mechanism made according to the subject invention. The screw of the prior art apparatus is replaced by attachable/detachable part 22 attached by screw 23 to arm 19 of the bellcrank 16'. Part 22 has an equilateral triangle planform and is oriented so that one of the three apexes (i.e. points) of the triangular part points directly at the segment plate 13'. Shoulder 24 on arm 19' serves to so orient the triangular part. The adjustability provided by the screw in the prior art apparatus is provided in the subject apparatus by a set screw installed in the backstop, the set screw not being visible in FIG. 2 but being shown schematically in FIG. 3, a section taken at 3—3 in FIG. 2. Sufficient end play is provided between the brackets to allow adjustment of screw 25, end 26 of which becomes the stop face of the backstop, to move the plate 13' toward the triangular part 22.

Referring again to FIG. 2, face 27 on arm 19' may be angled with respect to the axis of pivot 17' so that the linear point on part 22 will align with any of radial serrations 28 on plate 13' if a plane perpendicular to the axis of pivot 17' and intersecting the point of contact of the pointed part and the plate does not intersect the axis of pivot 12'.

It is considered to be understandable from this description that the subject invention meets its objectives. Part 22 is less prone to wearing out than screw 18 because there is line contact between part 22 and the plate instead of the point contact of the screw. When the point of part 22 in use wears, the part is easily removed and adjusted to present a second point for use, cutting the need for part replacement to one-third that of a single point part. Wear of part 22 in no way inhibits or prevents readjustment or replacement of the part. Adjustability of the apparatus is maintained by the use of the set screw in the backstop.

It is also considered to be understandable that while one embodiment of the invention is described herein, other embodiments and modifications of the one described are possible within the scope of the invention which is limited only by the attached claims.

I claim:

1. Apparatus comprising a first bracket connected to a second bracket by a pivotable connection having a pivot pin with end play which allows relative movement between said first and second brackets, said pivot pin having a centerline, said apparatus further comprising:

a plate having a circular segment configuration with a center, a first side and a second side and being attached to said first bracket with said plate perpendicular to said centerline and with said center at said centerline, said second side being provided with a plurality of radial serrations, a backstop element being attached to said first bracket in close proximity to said first side of said plate, a clamping mechanism attached to said second bracket and having an adjustable part, said adjustable part having a plurality of points and being attached to said mechanisms such that one of said points is in close proximity to face said plurality of radial serrations on said second side of said plate, whereby when said clamping mechanism is operated and said point is moved against said plate and said plate is moved against said backstop element so that relative motion is prevented between said first and second brackets, and whereby said adjustable part having said plurality of points being adjustable with any one of said plurality of points in said close proximity to said plurality of radial serrations on said second side of said plate, said backstop element further comprising a set screw having a longitudinal axis and an end portion, said axis being perpendicular to said plate, said end portion of said set screws being in close proximity to said first side of said plate and adjustment of said set screw adjusts the proximity of said backstop element to said first side and said end play allows one of said points to engage one of said plurality of radial serrations of said second side of said plate.

* * * * *